United States Patent

[11] 3,627,877

| [72] | Inventor | Hendrik Ottens<br>Delft, Netherlands |
| --- | --- | --- |
| [21] | Appl. No. | 718,258 |
| [22] | Filed | Apr. 2, 1968 |
| [45] | Patented | Dec. 14, 1971 |
| [73] | Assignee | Koninklijke Nederlandsche Gist-En<br>Spiritusfabriek N.V. |
| [32] | Priorities | Apr. 4, 1967 |
| [33] | | Great Britain |
| [31] | | 15,345/67;<br>Oct. 24, 1967, Great Britain, No.<br>48,372/67 |

[54] TREATMENT OF SCHISTOSOMIASIS IN MAMMALS
17 Claims, No Drawings

[52] U.S. Cl. ........................................... 424/93
[51] Int. Cl. ....................................... A61k 27/00
[50] Field of Search ............................... 424/93

[56] References Cited
UNITED STATES PATENTS

| 2,717,226 | 9/1955 | Skovsted | 424/93 |
| --- | --- | --- | --- |
| 3,262,864 | 7/1966 | Kouchner | 424/93 |
| 2,809,112 | 10/1957 | Anderson | 424/93 |

FOREIGN PATENTS

| 682,993 | 7/1950 | Great Britain | 424/93 |
| --- | --- | --- | --- |

*Primary Examiner*—Sam Rosen
*Attorney*—Hammond & Littell

ABSTRACT: Therapeutic compositions and method for treatment of schistosomiasis in mammals which comprises intravenously administering to mammals infected with schistosomiasis an effective amount of live Gram-negative bacteria suspended in a suitable liquid. The invention also relates to a process for the preparation of said therapeutic compositions.

TREATMENT OF SCHISTOSOMIASIS IN MAMMALS

PRIOR ART

Schistosomiasis (bilharziasis) is a group of diseases caused by schistosomes, a genus of parasitic flukes of the family of Schistosomatidac belong to the class Trematoda. These small, wormlike organisms live in the veins of various internal organs of the infected man or animal. The epidemiology of the disease is associated with the presence of abundant surface water, since water snails act as the intermediate hosts and thus carry the infection back to the vertebrate host. The disease is spread over large parts of the world and covers major parts of South America Africa, the continent of Eastern Asia, Japan and the Philippines.

It is estimated that 200 million people are suffering from schistosomiasis and that this number is on the increase because in many parts of the world extensive irrigation works are being constructed which constitute an ideal place for the development of the intermediate host, the snail. As long as snails are infected from an existing center of human or animal schistosomiasis, it is obvious that such irrigation works may contribute greatly to the spreading of the disease. The disease is characterized by the body's reaction to the presence of eggs produced in huge quantities by the female worm. Such eggs penetrate all tissues and cause all types of local reactions. In addition, the damaged tissue has increased sensitivity to bacterial infections.

Drugs derived from trivalent antimony are frequently used to treat the disease. However, all these derivatives give rise to serious side effects, and they have to be administered over a prolonged period by injection. Thus human patients have to be hospitalized for a reliable treatment which is frequently impossible in areas where schistosomiasis is endemic. Recently, a new drug, 1-(5-nitro-2-thiazoly)-2-imidazoline, has been recommended and is said to give good results when administered orally over a period of 7–10 days. However, the drug is reported to be unsuitable for mass administration without close medical supervision.

Schistosomes inhabit the blood vessels of the infected vertebrate host and the general opinion is that schistosomes are free of micro-organisms such as bacteria. It is our experience that schistosomes isolated from experimentally infected mice contain no bacteria, but it has been found possible to induce bacteriological infections in schistosomes living in the bloodstream. While some bacteria can be present for shorter or longer periods in schistosomes without significant pathological effect upon them, there are others which can multiply vigorously in the intestinal tract of both the male and female schistosomes and such multiplication can attain such dimensions that the schistosomes are rapidly killed. The presence of large numbers of such bacteria in dead or diseased schistosomes may then easily be demonstrated by microscopic or culture techniques.

To accomplish such an infection of schistosomes, it is necessary to introduce the infective bacteria into the bloodstream of the vertebrate host and this can be accomplished most effectively by an intravenous injection. It has been found that a few hours after such an administration the presence of bacteria in the intestine of the schistosomes can be determined.

OBJECTS OF THE INVENTION

It is an object of the invention to provide novel therapeutic compositions for treating schistosomiasis.

It is another object of the invention to provide a novel method of treating schistosomiasis in warm-blooded animals.

It is a further object of the invention to provide a novel preparation of therapeutic compositions.

These and other objects and advantages of the invention will become obvious from the following detailed description.

THE INVENTION

The novel method of the invention of treating schistosomiasis in warm-blooded animals comprises administering intravenously to infected warm-blooded animals an effective amount of Gram-negative bacteria, preferably of the family of Enterobacteriaceae. Particularly preferred as bacteria having a high pathogenic activity against the infecting schistosomes and a low systemic pathogenic activity against the host are bacteria of the genera Escherichia, Klebsiella, Salmonella and Serratia.

An effective dose for the novel method is a predetermined number of live bacteria which is capable of infecting and killing a considerable proportion of the schistosomes. A fully effective therapy may consist of repeated intravenous injections of bacteria, or preferably of a single larger dose since the treatment is only effective if the schistosomes have already developed an intestine.

Surprisingly it has been found that these bacteria, once present inside the schistosomes, are protected against the effect of antibiotics administered in normal clinical dosages. It has, for instance, been demonstrated that administration of kanamycin, chloramphenicol or oxytetracycline in dosages producing blood levels far above the minimal inhibitory concentration for the respective bacteria, did not interfere at all with the multiplication of the bacteria in the intestine of the schistosomes. Nevertheless, the sensitivity of the bacteria present in the schistosomes to the corresponding antibiotic remained unaltered as bacteria released from the schistosomes retained their original sensitivity to the antibiotic in question.

Advantageously, the treatment of schistosomiasis may therefore be combined with the subsequent administration of an antibiotic, which is capable of eliminating the bacteria not taken up by the schistosomes and still present in the blood or caught in the recticulo-endothelial system. The antibiotic used for this purpose may be administered either by injection or orally, and should be given after the bacteria have been established in the schistosomes, for example, 1 to 2 hours after their injection. In case of parenteral injection, an antibiotic formulation with some sustained release properties can be of advantage.

The bacteria localized in the schistosomes begin to multiply and cause the death of the parasites and, therefore, it is advantageous to administer an antibiotic again at the time the parasites are destroyed in order to eliminate the bacteria liberated from the dead parasites.

Possible undesirable effects caused by bacterial components, e.g., polysaccharides originating from the bacteria present in the parasites, can be mitigated by known methods, e.g., with the use of gluco-corticosteroids. (A. Schauer and L. Gielow, die Naturwissenschaften, 54 (1967), 589). The requirement of low pathogenicity for the host on intravenous administration may, for instance in the case of the mouse, be estimated by comparing the minimal effective dose of the bacteria when administered intravenously with that given intraperitoneally. Since it is essential that the bacteria employed for the treatment should reach the location of the schistosomes, those which are administered by a route other than the direct intravenous route have to overcome the natural defensive mechanisms of the host. Ability to cope with such defenses usually indicates high pathogenicity, and an increased ratio of minimum effective intraperitoneal to intravenous dosage (i.p./i.v. ratio) probably indicates either a relatively lower pathogenicity for the host, or an increased pathogenicity against the schistosomes.

It has further been found that a strain with a high i.p./i.v. ratio in mice has a similar high ratio in hamsters. Therefore, the i.p./i.v. ratio as assessed in one species of animals appears to be a reliable indication for the suitability of the selected strain for the purpose claimed.

The activity of various strains of bacteria selected for the present invention may vary considerably with respect to their pathogenicity to the schistosomes and hosts. It has been found that the properties of some strains in this respect may be improved by cultivation under slightly alkaline conditions, preferably between pH 8 and 9.5. This may, for instance, be achieved with a strain of Klebsiella by using a nutrient broth (Difco) containing also 0.25 percent sodium sulfite (pH 8.2) or 0.35 percent dipotassium hydrogen phosphate (pH 8.0). Further improvements can be achieved by carrying out the cultivation at a temperature of 35° to 40° C. for 24 to 48 hours and followed by an aging period at room temperature (approx. 20° to 25° C.). By cultivating these bacteria under the conditions described above, it has been possible to increase the i.p./i.v. ratio to 1,000 or above.

Another way to obtain bacteria having a high i.p./i.v. ratio consists in treating with an antiserum recovered from animals having been immunized with a suitable strain of the same kind of bacterium and working the agglutinated and nonagglutinated parts of the culture separately. The improvement of the i.p./i.v. ratio depends on the used antiserum and on the cultivation conditions. The use of the agglutinated parts is then advantageous, when the antiserum added to the culture is obtained with a variety of the strain cultivated, which is very active against schistosomes. The culture medium may not contain fermentable carbohydrates.

When fermentable carbohydrates are added to the medium indeed it may be useful to use the nonagglutinated bacteria. The application of a distinct antiserum does not improve the i.p./i.v. ratio.

To find a suitable parent strain for further improvement by cultivation as hereinbefore described, any known method of selection by cloning or other separation techniques may be used. The strain of bacteria chosen for the purpose may contain natural stable mutants, or may have mutants induced by irradiation, for instance, with ultraviolet or X-rays. The mutants which are most promising on testing in a suitable infected test animal may then be further cultivated to improve their i.p./i.v. ratio. Also, bacteria with desirable properties may be selected with the help of known serological techniques suitable for the purpose. Preferred strains obtained by such methods are then tested in various infected animals and are further selected according to their consistently low pathogenicity to host animals and efficiency to kill the schistosomes. The very best strains in this respect are finally clinically investigated with human hosts.

The resulting strain can be used for intravenous injection in a suitable sterile diluent. The effective dosage depends on the pathogenicity of the bacteria for the schistosomes, and can be less than $5 \times 10^2$ bacteria/ g. of host body weight ($=5 \times 10^5$/kg.) or as high as $4 \times 10^4$/ g. of host body weight ($=4 \times 10^7$/kg.).

Some suspensions of living bacteria may be stored for months at a low temperature (e.g., 4° C.) without significant loss of activity. It is, however, more advantageous to dry the suspension by a method which gives adequate viability after reconstitution. Freeze-drying techniques, which are used for these types of bacteria have been found conveniently satisfactory for the purpose, and can give at least 60 percent viability when reconstituted as a suspension. Formulations usually contain $10^4$ to $10^8$ bacteria in a 0.2 ml. suspension.

Another aspect of the present invention, therefore, resides in providing a therapeutic composition for the treatment of schistosomiasis which contains Gram-negative bacteria preferably of the genera Escherichia, Klebsiella, Salmonella or Serratia selected for their high pathogenicity with respect to the schistosomes and low pathogenicity against the infected host in an effective dosage as a suspension in an intravenously injectable diluent. Preferably the composition is one containing bacteria as hereinbefore defined in a freeze-dried form in association with the residue of a suitable, known freeze-drying menstruum.

The present invention, in a further aspect, provides a process of producing a therapeutic composition which comprises the cultivation of the selected bacteria and the subsequent suspension of the bacteria in an intravenously injectable diluent in a predetermined dosage. In the preferred embodiments of the invention, the process of cultivation is carried out under a slightly alkaline pH, or at 35° to 40° C. followed by a period of aging at room temperature. The diluent used for the purpose of formulation may be any injectable solution, such as a saline solution, which is both innocuous to the host and to the living bacteria.

In a further aspect, a process is provided which comprises the steps of cultivating the selected bacteria, and freeze-drying the suspension of the bacteria in a known manner to give adequate viability after reconstitution. The freeze-dried preparation is preferably stored in a sealed form containing bacteria to give a predetermined amount of live bacteria on reconstitution.

In the following examples there are described several preferred embodiments to illustrate the invention. However, it should be understood that the invention is not intended to be limited to the specific embodiments.

EXAMPLE I

Mice of strain RQ of the same sex and same weight (about 20 g.) were injected subcutaneously with 80–100 cercaria of *Schistosoma mansoni* which for mammals are the infectious phase of the life cycle of Schistosoma and may be excreted by infoot snails. The said mice after a 6 week incubation period harbored 20 to 30 pairs of male and female schistosomes.

One to 3 weeks later the mice were used in a test to determine the effectiveness of the bacterial suspensions under study. When reference is made to "mice" in the following examples, infected mice as described above are meant. The bacterial suspensions are injected intravenously. As a rule, the effect of the treatment is checked after 1 week by killing the animals with chloroform. Autopsy is performed and the localization and condition of the schistosomes are determined. At the same time an oo-gram is made according to the method described by Pellegrino o.s. *Am. J. Trop. Med. and Hyg.*, (1962), 11, 201).

A strain of *Klebsiella pneumoniae*, E15, was cultivated for 24 hours at 37° C. under aerobic conditions in liquid medium of pH 7.0 and of the following composition:

20 grams of malt extract paste (Trifax),
10 grams of yeast extract (Gistex, KNGSF) and
5 grams of corn steep solids per liter.

After incubation, the bacteria were centrifuged off and resuspended in saline. The number of bacteria present in the suspension was found to be $4 \times 10^8$ per ml. (method of Miles et al. J. Hyg. (1938), 38, 732). Dilutions of 1:10, 1:30, 1:100, 1:300, and 1:1,000 in saline were prepared whereupon 0.2 ml. of these dilutions, including the undiluted suspension, were injected intravenously into groups of six mice each. After 1 week the number of survivors were 4, 6, 6, 6, 6, and 5 in each group, respectively. Upon examination, all surviving animals were free of schistosomes whereas all nontreated control animals were either infected or dead. The minimal effective dose therefore was less than $8 \times 10^4$ bacteria per mouse.

EXAMPLE II

A strain of *Escherichia coli* E2 was cultivated for 24 hours at 37° C. under aerobic conditions in a liquid medium of the following composition at an initial pH of 7.0:

20 grams of malt extract paste (Trifax),
10 grams of yeast extract (Gistex, KNGSF) and
5 grams of corn steep solids per liter.

After incubation, the bacteria were centrifuged off and resuspended in saline. This suspension contained $2.8 \times 10^8$ bacteria per ml. Dilutions of 1:10, 1:30, 1:100, 1:300 and 1:1,000 with saline were prepared. All dilutions as well as the undiluted suspension, 0.2 ml. was injected intravenously into groups of 5 infected mice each. From these groups 5, 4, 5, 5, 5, 5 animals, respectively, survived after 7 days. All animals, except the one belonging to the group injected with a dilution of 1:1,000 were found to be free of living schistosomes whereas the 1:1,000 group showed a normal infection and a normal oo-gram. The minimal effective does therefore in this case was $2 \times 10^5$ bacteria per mouse.

EXAMPLE III

A strain of *Salmonella paratyphi*, group E, No. 4286/63, was incubated for 24 hours at 37° C. under aerobic conditions in a Brain Heart infusion broth (Difco). After incubation, the bacteria were centrifuged off and resuspended in saline to obtain $5.4 \times 10^8$ bacteria per ml. Of the undiluted suspensions as well as of dilutions of 1:10, 1:100, 1:300, 1:1,000, 1:3,000 and 1:10,000 in saline, 0.2 ml. was injected intravenously in groups of 5 infected mice. From these groups of mice 1, 2, 0, 2, 2 and 2 animals, respectively, survived after 1 week. All surviving animals were found to be free of living schistosomes. The minimal effective dose therefore in this case was $10^4$ bacteria or less per mouse.

EXAMPLE IV

Seven groups of five infected mice each were injected intravenously with a strain of *Klebsiella pneumoniae* E 15 which had four on Endo-agar (Difco) and incubated at 37° C. for 24 hours, followed by an aging period at room temperature (20° two C.). The formulation used for injection contained the harvested colonies suspended in saline solution at a concentration of 3 to $7 \times 10^8$ bacteria/ml.

Six groups were treated with a single dose of 50 mg./kg. of kanamycin given either intraperitoneally or intravenously. The i.p. treatment was administered to four groups at 2 hours before, 1 hour before, coincident with and 1 hour after, respectively, the injection of bacteria. Intravenous treatments to two groups were 1 hour before and 1 hour after, respectively, the bacterial injection. The seventh group received no kanamycin treatment and served as a control. After 7 days all mice were sacrificed and the influence of the treatment studied. The results are shown in table I.

TABLE I

| Time of kanamycin administration (hours before or hours after injection of bacteria) | Method of kanamycin injection | Result of bacteria injection on schistosomes |
| --- | --- | --- |
| −2 hours | i.p. | a sporadic living worm-pair oo-gram: mainly mature eggs schistosomes in mesenterial blood vessels |
| −1 hour | i.p. | |
| −1 hour | i.v. | ibid |
| 0 hour | i.p. | ibid |
| +1 hour | i.p. | no living schistosomes present |
| +1 hour | i.v. | ibid |
| no administration of kanamycin | | ibid |

EXAMPLE V

A group of five infected mice were injected intravenously with a suspension of *Klebsiella pneumoniae* E 10 plated, incubated and suspended as described in example IV. Twenty-four hours after this injection, chloroamphenicol was administered intraperitoneally at a dose of 50 mg./kg. per day for 5 days. On the 7th day after the bacterial injection, three of the five mice had survived. All three mice were found to be free of schistosomes.

EXAMPLE VI

A group of five infected mice were injected intravenously with a suspension of *E. coli* E 2 plated, incubated and suspended as described in example IV. Twenty-four hours after this injection, intraperitoneal administration of kanamycin was started at a dose of 50 mg./kg./day in two equal doses for a period of 5 days. On the 7th day after the bacterial injection, all mice were still alive. Upon autopsy, none of the mice were any longer carrying live schistosomes.

EXAMPLE VII

An experiment was carried out as reported under example IV, except that the treatment was made with oxytetracycline at the same dose and on the same time schedule. On the 7th day after the bacterial injection, three mice were still alive and none of them were carrying live schistosomes.

EXAMPLE VIII

Mice infected with schistosomes were injected intravenously with a suspension of *Klebsiella pneumoniae* E 13 plated, incubated and suspended as in example IV. After 24 hours, i.p. treatment with kanamycin was started at 50 mg./kg./day for 1 day. Upon autopsy, it appeared that all schistosomes were dead and could be found in a disintegrated condition in the liver. *Klebsiella pneumoniae* could be isolated from liver tissue. Sensitivity of the original culture for kanamycin was $12 \mu g./ml.$ and the culture isolated from the liver had exactly the same sensitivity.

EXAMPLE IX

*Klebsiella pneumoniae* E 10 was cultivated for 24 hours at 37° C. under aerobic conditions in nutrient broth (Difco) to which 0.25 percent sodium sulfite was added. After incubation, the culture remained for 48 hours at room temperature whereupon it was centrifuged and resuspended in saline. Using the method of example I, the minimal effective dose was determined which would free the mice of all schistosomes and it was found that this dose was $2 \times 10^3$ bacteria per mouse.

EXAMPLE X

A culture of *Klebsiella pneumoniae* E 10 was seeded on an agar medium (blood agar base No. 2, Difco) in such a manner that after incubation solitary colonies were formed. Using the replica technique of Lederberg, (Lederberg and Lederberg, J. Bact., 63 (1952) 339), replica plates were made on agar media, including Endo-agar (Difco) and McConkey-agar (Difco).

The plates were incubated at 37° C. for 24 hours and thereafter stored at 20°–24° C. At regular intervals, the plates were inspected and corresponding colonies compared. All colonies or parts of colonies with a different morphology were investigated. In this way a colony with a glossy appearance was isolated at No. E 10RS. Cultures were made of E 10 and of substrain E 10RS in Nutrient Broth (Difco) at pH 6.6 and pH 8.9. The high pH was obtained by addition of dipotassium hydrogen phosphate (4 g./liter) and sodium hydroxide. These cultures were incubated at 37° C. for 24 hours. Additionally, a culture at pH 6.6 was incubated at 37° C. for 24 hours and then placed at 20°–24° C. for 3 days for aging.

At the end of the incubation period, the bacteria were removed from the medium by centrifugation, washed once in saline and resuspended in saline in a concentration of $2.6 \times 10^8$ bacteria/ml. The exact number of living bacteria was assessed with the method of Miles et al. Of these suspensions, the following dilutions in saline were made: 1/10, 1/100, 1/300, 1/1,000, and 1/3,000. Of these dilutions, 0.2 ml. was injected intravenously in groups of five schistosome infected mice each. Other groups of five mice were injected intraperitoneally with 0.2 ml. of the undiluted suspension and the same volume of the dilutions 1/10 and 1/100. Seven days after the injection, all mice were killed and the effect of the treatment assessed using the method of Pellegrino. In this way, the minimal effective dose (MED) of each bacterial culture was defined by routes of administration. The results are shown in table II.

TABLE II

| Strain | Nutrient broth | | MED [1] | | Ratio, I.p./I.v. |
|---|---|---|---|---|---|
| | pH | Aging | I.v.[2] | I.p.[2] | |
| E 10 | 6.6 | No | >3×10⁶ | 3×10⁷ | <10:1 |
| | 6.6 | Yes | 1.2×10⁶ | 1.2×10⁷ | 10:1 |
| | 8.9 | No | 2×10⁵ | 2×10⁷ | 100:1 |
| E 10RB | 6.6 | No | 5×10⁵ | 5×10⁷ | 100:1 |
| | 6.6 | Yes | 1.3×10⁵ | 1.3×10⁸ | 1,000:1 |
| | 8.9 | No | 1×10⁴ | >3×10⁷ | >3,000:1 |

[1] The MED is given as the number of bacteria per mouse (20 g.).
[2] The highest dose given was not effective.

EXAMPLE XI

Substrain E 10RB, isolated from a stock culture of *Klebsiella pneumoniae* E 10, as described in example X, was seeded in Nutrient Broth (Difco) brought to pH 8.9 with dipotassium hydrogen phosphate. Part of the culture was incubated at 37° C. for 24 hours and another part, after incubation at 37° C., was aged at room temperature for 3 days. Both cultures were centrifuged, washed and resuspended in saline to contain $2.6 \times 10^8$ bacteria/ml. The number of living bacteria in each suspension was assessed with the method of Miles et al. With both suspensions, dilutions of 1/10, 1/100, 1/300, 1/1,000, and 1/3,000 in saline were prepared. 0.2 ml. of these dilutions were injected intravenously into groups of five schistosome infected mice each. Other groups of five mice were injected intraperitoneally with 0.2 ml. of the undiluted suspensions and with the same volume of the 1/10 and 1/100 dilutions.

Seven days after the injection, all mice were killed and the effect of the treatment assessed using the method of Pellegrine to define the minimal effective dose (MED) of the two cultures for both routes of administration. The results are shown in table III.

TABLE III

| Strain | Aging | MED [1] | | Ratio, I.p./I.v. |
|---|---|---|---|---|
| | | I.v.[2] | I.p.[3] | |
| E 10RB | No | 3.6×10⁵ | 3.6×10⁶ | 10:1 |
| | Yes | <1.2×10⁴ | >1.2×10⁷ | 1,000:1 |

[1] The MED is given as the number of bacteria per mouse (20 g.).
[2] The smallest given was still effective.
[3] The highest dose given was not effective.

EXAMPLE XII

Two Patas monkeys weighing 3.0 and 3.4 kg., respectively, were infected percutaneously with 1,000 and 750 cercariae of an Egyptian strain of S. mansoni. From the 6th week after infection, frequent egg counts were carried out on faecal samples, using the Caldwell and Caldwell technique (Am. J. of Hyg. 6 (1926), supplement pages 146–159). The monkeys then received by intracardiac injection a dose of 1.2 and $1.36 \times 10^{10}$ *Klebsiella pneumonia* bacteria, respectively. The animals were sacrificed 8 and 18 days after the injection of bacteria and it was found that 57 and 67 percent of the flukes had been killed by the bacteria and were in a state of disintegration in the liver of the monkeys.

EXAMPLE XIII

Strain Klebsiella E 10 was cultured in Brain Heart Infusion broth (Difco) for 18 hours at 37° C., followed by an ageing period of 3 days at room temperature. To equal parts of this culture one of 3 antisera was added. One serum (S 182) was prepared by immunizing rabbits with a serologically distinct strain (E 15). The other two antisera were prepared with two variants of strain E 10, the first variant being highly active against schistosomes in mice (serum S 224), the second one having only a very low activity against schistosomes (serum S 228). Agglutinated and nonagglutinated bacteria were collected, washed in saline, resuspended in saline and tested for activity in mice.

In a second series of experiments the strain E 10 was cultivated in Nutrient Broth (Difco) brought to pH 8.9 with K₃HPO₄ (approx 5 g./l.). To this medium was added 1 percent glucose and 2 percent antiserum S 224. During the cultivation at 37° C. per 18 hours part of the bacteria were agglutinated. Agglutinated and nonagglutinated bacteria were collected, washed in saline, resuspended in saline and tested for activity.

The results of these tests are given in the following table.

Activity of strain Klebsiella E 10 in mice after treatment with antisera.

| Medium | Glucose | Antiserum (2%) | Supernatant agglutinate | MED | | I.p./i.v. ratio |
|---|---|---|---|---|---|---|
| | | | | I.p. | I.v. | |
| BHI | − | S 182 | S | 1.2×10⁸ | 1.2×10⁷ | 10 |
| | | | A | 1.5×10⁷ | 4×10⁵ | 30 |
| BHI | − | S 224 | S | 5×10⁷ | 5×10⁵ | 100 |
| | | | A | >6×10⁷ | 6×10⁴ | >1,000 |
| BHI | − | S 228 | S | 6×10⁷ | 6×10⁴ | 1,000 |
| | | | A | 2×10⁶ | 2×10⁷ | 1/10 |
| NB 8.9 | + | S 224 | S | 1.2×10⁷ | 4×10⁴ | 300 |
| | | | A | 1.2×10⁷ | 1.2×10⁵ | 100 |

Legends:
BHI = Brain Heart Infusion Broth (Ditco)
NB 8,9 = Nutrient Broth (Difco), brought to pH 8,9
S = bacteria collected from the supernatant
A = bacteria collected from the agglutinate
MED = minimal effective dose in number of bacteria per mouse
i.p. = bacteria infected intraperitoneally
i.v. = bacteria infected intravenously.

EXAMPLE XIV

Klebsiella pneumoniae E 10 was cultured in Brain HEART Infusion Broth to which was added 2 percent rabbit antiserum. Two sera were used. One serum S 224 was prepared by immunizing a rabbit with a suspension of *Klebsiella pneumoniae* E 10 that had been shown to be very active against schistosomes in mice. The other serum S 228 was prepared by immunizing a rabbit with suspension of *Klebsiella pneumoniae* E 10 with a very weak activity against schistosomes in mice. In both cultures, part of the bacteria was agglutinated during their growth. These agglutinated bacteria were collected, washed with saline and resuspended in saline. Both suspensions were then tested for activity on schistosomes in mice. In table IV the results of this test are given. Suspension E 10–S 224, prepared with the help of an antiserum of an active E 10 strain showed a lower MED and a higher i.p./i.v. ratio than suspension E 10–S 228.

TABLE IV

| Strain | Dilution | Bacteria/ mouse | I.v./I.p. route of injection | Number of mice, start/end | oo-gram | I.p./i.v. Ratio |
|---|---|---|---|---|---|---|
| E 10-S 224 | Undiluted | 6×10⁷ | I.v. | 4/5 | +++/+++/+++/+++ | 0 |
|  | 1/10 | 6×10⁶ | I.v. | 5/5 | +++/+++/+++/+++/+++ | 1,00 |
|  | 1/100 | 6×10⁵ | I.v. | 4/4 | +++/+++/+++/+++ |  |
|  | 1/300 | 2×10⁵ | I.v. | 5/5 | +++/+++/+++/+++ | <1 |
|  | 1/1,000 | 6×10⁴ | I.v. | 4/5 | +++/−/−/− |  |
|  | 1/3,000 | 2×10⁴ | I.v. | 5/5 | −/−/−/−/− |  |
|  | Undiluted | 6×10⁷ | I.p. | 1/5 | − |  |
|  | 1/10 | 6×10⁶ | I.p. | 5/5 | −/−/−/−/− |  |
|  | 1/100 | 6×10⁵ | I.p. | 5/5 | −/−/−/−/− |  |
| E 10-S 228 | Undiluted | 2×10⁸ | I.v. | 4/5 | +++/+++/+++/+++ | 10 |
|  | 1/10 | 2×10⁷ | I.v. | 4/5 | +++/+++/+++/+++ |  |
|  | 1/100 | 2×10⁶ | I.v. | 5/5 | −/−/−/−/− | >100 |
|  | 1/300 | 6×10⁵ | I.v. | 5/5 | −/−/−/−/− |  |
|  | 1/1,000 | 2×10⁵ | I.v. | 5/5 | −/−/−/−/− |  |
|  | 1/3,000 | 6×10⁴ | I.v. | 5/5 | −/−/−/−/− |  |
|  | Undiluted | 2×10⁸ | I.p. | 3/5 | +++/+++/+++ |  |
|  | 1/10 | 2×10⁷ | I.p. | 3/5 | +++/+++/+++ |  |
|  | 1/100 | 2×10⁶ | I.p. | 5/5 | +++/+++/−/−/− |  |

NOTE.—+++ = Only mature eggs present; ++ = Low percentage of immature eggs found; − = Normal oo-gram; I.v.=Intravenous injection (0.2 ml. per mouse); I.p.=Intraperitoneal injection (0.2 ml. per mouse).

EXAMPLE XV

Klebsiella E 10 was cultured in Brain Heart Infusion Broth (Difco) containing 2 percent rabbit antiserum for 18 hours at 37° C. The serum (No. S 204) was prepared by immunizing a rabbit with a strain of Klebsiella E 15. This particular strain was only moderately active against schistosomes in mice, when injected intravenously. During the growth in this medium, part of the bacteria was agglutinated and was present as a heavy deposit in the culture tube. These agglutinated bacteria were removed, the bacteria in the supernatant were spun down, washed and resuspended in saline. This suspension E 10-204 was used in the following experiments with mice and hamsters.

A second culture of Klebsiella E 10 was made by seeding it in Nutrient Broth (Difco) with 1 percent glucose brought to pH 8.9 with dipotassium hydrogen phosphate. The culture was incubated at 37° C. for 18 hours and to this culture 2 percent rabbit antiserum was added. This serum (S 224) was prepared by immunizing rabbits with a particular strain of Klebsiella E 10, which had proved to be very active against schistosomes in mice, when injected intravenously. The heavy precipitate that was formed by adding the antiserum was removed, the bacteria in the supernatant spun down, washed in saline and resuspended in saline. This suspension E 10-224 was compared with suspension E 10-204 for its activity in mice and hamsters infected with schistosomes.

In table V the activity of the two strains in the mouse test is given. Strain E 10-204 showed a low i.p./i.v. ratio, strain E 10-224 had a much higher i.p./i.v. ratio (3 and 300, respectively). Both strains then were tested on hamsters. In table VI the worm burden and the oo-gram of untreated hamsters are given. In tables VII and VIII, the activity of the two strains in the hamster test are shown. Strain E 10-204 again had a low i.p./i.v. ratio (100:10=10) whereas strain E 10-224 showed a very high ratio (1,000:1=1,000).

TABLE V.—ACTIVITY OF THE STRAINS E 10-224 AND E 10-204 IN THE MOUSE TEST

| Strain | Dilution | Bacteria/ mouse | I.v./I.p. route of injection | Number of mice, start/end | oo-gram | I.p./i.v. ratio |
|---|---|---|---|---|---|---|
| E 10-224 | Undiluted | 1.2×10⁸ | I.v. | 4/5 | +++/+++/+++/+++ | 300:1=300 |
|  | 1/10 |  | I.v. | 4/5 | +++/+++/+++/+++ |  |
|  | 1/100 |  | I.v. | 4/5 | +++/+++/+++/− |  |
|  | 1/300 | 0.4×10⁶ | I.v. | 3/5 | +++/+++/+++ |  |
|  | 1/1,000 |  | I.v. | 3/5 | −/−/− |  |
|  | 1/3,000 |  | I.v. | 5/5 | −/−/−/−/ |  |
|  | Undiluted | 1.2×10⁸ | I.p. | 4/5 | +++/+++/+++/− |  |
|  | 1/10 |  | I.p. | 5/5 | −/−/−/−/− |  |
|  | 1/100 |  | I.p. | 5/5 | −/−/−/−/− |  |
| E 10-204 | Undiluted | 8×10⁷ | I.v. | 3/5 | +++/+++/+++ | 300:100=3 |
|  | 1/10 |  | I.v. | 3/5 | +++/+++/+++ |  |
|  | 1/100 |  | I.v. | 4/5 | +++/+++/+++/+++ |  |
|  | 1/300 | 2.7×10⁵ | I.v. | 4/5 | +++/++/++/+++ |  |
|  | 1/1,000 |  | I.v. | 3/5 | −/−/− |  |
|  | 1/3,000 |  | I.v. | 5/5 | −/−/−/−/− |  |
|  | Undiluted | 8×10⁷ | I.p. | 3/5 | −/+++/+++ |  |
|  | 1/10 |  | I.p. | 3/5 | +++/+++/+++ |  |
|  | 1/100 |  | I.p. | 3/5 | −/++/++ |  |

NOTE.—+++ = Only mature eggs present; ++ = Low percentage of immature eggs found; − = Normal oo-gram; I.v.=Intravenous injection (0.2 ml. per mouse); I.p.=Intraperitoneal injection (0.2 ml. per mouse).

TABLE VI

Untreated hamsters (control group, no deaths) Worm burden and oo-gram.

| Worm pairs in | | oo-gram |
|---|---|---|
| v. porta | vv mesent. |  |
| 15 | 12 | normal |
| 15 | 15 | normal |
| 12 | 8 | normal |
| 14 | 10 | normal |
| 5 | 5 | normal |

TABLE VII.—Activity of strain E 10-224 in the hamster test.

| Dilution | I.c./I.p. route of injection | Bacteria hamster | Worm pairs in— | | oo-gram | Therapeutic result |
|---|---|---|---|---|---|---|
|  |  |  | V. porta | V.v. mesent. |  |  |
| 1/10 | I.c. | 2.4×10⁷ | 0 | 0 | +++ | + |
|  |  |  | 0 | 0 | +++ |  |
| 1/100 | I.c. |  | 3 (4♂♂) | 0 | ++ | + |
|  |  |  | 4 (4♂♂) | 0 | − |  |
|  |  |  | 8 (4♂♂) | 12 | − |  |

TABLE VII.—Activity of strain E 10-224 in the hamster test.

| Dilution | I.c./i.p. route of injection | Bacteria hamster | Worm pairs in— | | | Therapeutic result |
|---|---|---|---|---|---|---|
| | | | V. porta | V. v. mesent. | oo-gram | |
| 1/300 | I.c. | | 1<br>0 (2♂♂)<br>15 | 5<br>0<br>10 | −<br>++<br>− | + |
| 1/1,000 | I.c. | | 0 (2♂♂)<br>4<br>2 | 3 (4♂♂)<br>6<br>1 | +++<br>−<br>− | + |
| Undiluted | I.p. | 2.4×10⁸ | 0 (6♂♂)<br>3 (3♂♂) | 0<br>0 | +++<br>+++ | + |
| 1/10 | I.p. | | 15<br>15<br>15 | 5<br>10<br>10 | −<br>−<br>− | − |
| 1/100 | I.p. | | 15<br>15 | 10<br>20 | −<br>− | − |

Legends:
oo-gram:
+++ = only mature eggs present
++ = low percentage of immature eggs found
− = normal oo-gram
i.c. = intracardial injection (0.4 ml. per hamster)
i.p. = intraperitoneal injection (0.4 ml. per hamster)

TABLE VIII.—Activity of strain E 10-204 in the hamster test.

| Dilution | I.c./i.p. route of injection | Bacteria hamster | Worm pairs in— | | | Therapeutic result |
|---|---|---|---|---|---|---|
| | | | V. porta | V. v. mesent. | oo-gram | |
| 1/10 | I.c. | 1.6×10⁷ | 0<br>0 | 0<br>0 | +++<br>+++ | + |
| 1/100 | I.c. | | 0<br>15<br>10 | 0<br>6<br>12 | +++<br>+ | ± |
| 1/300 | I.c. | | 12<br>20 | 20<br>15 | −<br>− | − |
| 1/1,000 | I.c. | | 0 | 0 | +++ | ? |
| Undiluted | I.p. | 1.6×10⁸ | 0 | 0 | +++ | + |
| 1/10 | I.p. | | 3 (6♂♂)<br>4 | 4<br>0<br>10 | −<br>++<br>− | + |
| 1/100 | I.p. | | 20<br>15 | 20<br>15 | −<br>− | − |

EXAMPLE XVI

Albino mice, of Clark's O.S.I. strain, each received by the percutaneous route approximately 150 cercariae of *Schistosoma mansoni*. Then weeks later the presence of mature infections was confirmed by the detection of viable schistosome eggs in the feces of the mice. At that time each mouse was given a single intravenous injection of a saline suspension of *Serratia marcescens* containing an estimated $10^8$ bacteria/ml. each of five mice received an estimated $3.2\times10^7$ bacteria.

This suspension was prepared by overnight incubation of a freeze dried sample of *S. marcescens* (Wellcome CN 1999) in nutrient agar at 28° C. The culture was harvested and washed in distilled water, then diluted for use in physiological saline and estimates of the number of organisms in suspensions were made by opacity tests. The three surviving mice were autopsied 9 days later when it was found that 93.5 percent of the schistosomes had been killed and were in a state of disintegration in the intrahepatic vessels.

EXAMPLE XVII

A similar experiment was preformed using 10 infected mice. In four mice, which were autopsied 72 hours after injection of the bacteria, 55.5 percent of the schistosomes were found dead in the liver. The remaining four mice were autopsied 9 days after the injection when 91.5 percent of the schistosomes were dead in the liver and the oo-gram revealed that all laying had ceased. Two other groups of five mice received by intravenous injection $3.2\times10^5$ bacteria/mouse and $3.2\times10^3$ bacteria/mouse, respectively. When both groups were autopsied 9 later, 75 and 20 percent respectively, of the schistosomes were found to have been killed.

Various modifications of the compositions of the invention may be made without departing from the spirit or scope thereof and it is to be understood that the invention is to be limited only as defined in the appended claims.

I claim:
1. A composition for intravenous administration for treatment of schistosomiasis comprising a suspension of $10^4$ to $10^8$ live Gram-negative bacteria of the family Enterobacteriaceae in a liquid suitable for intravenous injection, the strain of bacteria having an intraperitoneal to intravenous ratio greater than 500.
2. The composition of claim 1 wherein the bacteria have a high-pathogenic activity against infecting schistosomes and a low-systemic pathogenic activity against the host and belong to a genus selected from the group consisting of Escherichia, Klebsiella, Salmonella and Serratia.
3. A composition of claim 1 wherein the bacteria is *Klebsiella pneumoniae*.
4. A composition of claim 1 wherein the bacteria is *Escherichia coli*.
5. A composition of claim 1 wherein the bacteria is *Serratia marcescens*.
6. A composition of claim 1 wherein the bacteria is *Salmonella paratyphi*.
7. A method of treating schistosomiasis in mammals which comprises administering intravenously to infected mammals an effective amount of suspension of live Gram-negative bacteria of the family Enterobacteriaceae in a liquid suitable for intravenous injection, the strain of bacteria having an intraperitoneal to intravenous ratio greater than 500.
8. The method of claim 7 wherein the bacteria belongs to a genus selected from the group consisting of Escherichia, Klebsiella, Salmonella and Serratia.
9. A method of claim 7 wherein the bacteria is *Klebsiella pneumoniae*.
10. A method of claim 7 wherein the bacteria is *Escherichia coli*.
11. A method of claim 7 wherein the bacteria is *Serratia marcescens*.
12. A method of claim 7 wherein the bacteria is *Salmonella paratyphi*.
13. The method of claim 7 wherein the injected suspension contains about $5\times10^5$ to about $4\times10^7$ per kg. of host body weight.

14. The method of claim 13 wherein an effective amount of an antibiotic effective against the Gram-negative bacteria is administered to the warm-blooded animal at least 1 hour after the administration of the bacteria suspension.

15. The method of claim 14, wherein the antibiotic is administered intraperitoneally.

16. The method of claim 14, wherein a second subsequent administration of the antibiotic is performed.

17. The method of claim 16, wherein the second antibiotic administered is effected 7 days later.

* * * * *

UNITED STATES PATENT OFFICE

CERTIFICATE OF CORRECTION

Patent No. 3,627,877          Dated December 14, 1971

Inventor(s) Hendrik Ottens

It is certified that error appears in the above identified patent and that said Letters Patent are hereby corrected as shown below:

Column 5, line 20    "had four on" should read --had been plated out on four-- line 21    "two c" should read -- to 25°C--

Column 12, line 21 (claim 1) "104" should read --$10^4$--

Signed and sealed this 26th day of September 1972.

(SEAL)
Attest:

EDWARD M. FLETCHER,
Attesting Officer

ROBERT GOTTSCHALK
Commissioner of Patents